US009164998B2

(12) United States Patent
Klevenz et al.

(10) Patent No.: US 9,164,998 B2
(45) Date of Patent: Oct. 20, 2015

(54) ARCHIVE-SYSTEM-INDEPENDENT ARCHIVE-TYPE OBJECTS

(75) Inventors: Stephan Klevenz, Heidelberg (DE);
Dieter Guendisch, Karlsruhe (DE);
Achim Weigel, Kaiserslautern (DE);
Martin P. Fischer, Heidelberg (DE);
Paul Goetz, Wiesbaden (DE); Martin Hermes, Muehlhausen (DE); Heiko Kiessling, Eppelheim (DE); Martin Kreyscher, Heidelberg (DE); Corneliu D. Mitu, Rauenberg (DE); Alexander Rieder, Herxheim (DE); Johannes Weber, Heidelberg (DE); Juergen Schneider, Otterstadt (DE)

(73) Assignee: SAP SE, Walldorf (DE)

(*) Notice: Subject to any disclaimer, the term of this patent is extended or adjusted under 35 U.S.C. 154(b) by 523 days.

(21) Appl. No.: 12/845,905

(22) Filed: Jul. 29, 2010

(65) Prior Publication Data

US 2012/0030180 A1   Feb. 2, 2012

(51) Int. Cl.
*G06F 7/00* (2006.01)
*G06F 17/30* (2006.01)

(52) U.S. Cl.
CPC .... *G06F 17/30073* (2013.01); *G06F 17/30578* (2013.01); *G06F 17/3089* (2013.01)

(58) Field of Classification Search
CPC .................................................. G06F 17/3089
USPC .......................................... 707/999.104, 661
See application file for complete search history.

(56) References Cited

U.S. PATENT DOCUMENTS

| 6,427,032 | B1* | 7/2002 | Irons et al. ..................... 382/306 |
| 6,704,118 | B1* | 3/2004 | Hull et al. ..................... 358/1.15 |
| 7,146,356 | B2* | 12/2006 | Choi et al. ..................... 707/706 |
| 7,222,142 | B2 | 5/2007 | Fischer et al. |
| 7,457,933 | B2 | 11/2008 | Pferdekaemper et al. |
| 7,475,401 | B1 | 1/2009 | Frey et al. |
| 7,490,347 | B1 | 2/2009 | Schneider et al. |
| 7,516,129 | B2* | 4/2009 | Risberg et al. ........................ 1/1 |
| 7,539,675 | B2* | 5/2009 | Risberg et al. ........................ 1/1 |
| 7,577,682 | B2 | 8/2009 | Mueller et al. |
| 7,606,893 | B2 | 10/2009 | Petrov et al. |
| 7,620,908 | B2 | 11/2009 | Klevenz et al. |

(Continued)

OTHER PUBLICATIONS

OASIS Content Management Interoperability Services, https://www.oasis-open.org/committees/tc_home.php?wg_abbrev=cmis (last visited Aug. 30, 2012).

(Continued)

*Primary Examiner* — Eliyah S Harper
(74) *Attorney, Agent, or Firm* — Fish & Richardson P.C.

(57) ABSTRACT

This disclosure provides various embodiments for archiving a business object. At least one particular business object is identified for archiving. The particular business object has associated data including type data corresponding to a business object type of the at least one particular business object, structured business data, and unstructured attachment data. At least one archive-type object is created corresponding to the particular business object by enriching the unstructured attachment data with type-specific metadata including data identifying at least one attribute of the business object type. The archive-type object is archive-system-independent. The at least one archive-type object is exported to at least one archiving system for storage in at least one memory device of the archiving system.

20 Claims, 8 Drawing Sheets

(56) References Cited

U.S. PATENT DOCUMENTS

| | | | |
|---|---|---|---|
| 7,640,594 B2 | 12/2009 | Becker et al. | |
| 7,650,609 B2 | 1/2010 | Klevenz et al. | |
| 7,653,667 B2 | 1/2010 | Pferdekaemper et al. | |
| 7,657,609 B2 | 2/2010 | Klevenz et al. | |
| 7,676,542 B2 | 3/2010 | Moser et al. | |
| 7,693,881 B2 | 4/2010 | Fischer et al. | |
| 7,693,890 B2 | 4/2010 | Fischer et al. | |
| 7,702,673 B2* | 4/2010 | Hull et al. | 707/707 |
| 7,707,506 B2 | 4/2010 | Weigel et al. | |
| 7,721,266 B2 | 5/2010 | Frey et al. | |
| 7,739,374 B1 | 6/2010 | Frey et al. | |
| 7,756,813 B2 | 7/2010 | Pferdekaemper et al. | |
| 7,756,814 B2 | 7/2010 | Fischer et al. | |
| 7,827,160 B2 | 11/2010 | Kuhr et al. | |
| 7,836,123 B2 | 11/2010 | Thommes et al. | |
| 7,894,602 B2 | 2/2011 | Mueller et al. | |
| 7,895,233 B2 | 2/2011 | Weigel et al. | |
| 7,925,641 B2 | 4/2011 | Albrecht et al. | |
| 8,090,754 B2 | 1/2012 | Schmidt et al. | |
| 8,140,866 B2 | 3/2012 | Becker et al. | |
| 8,396,854 B2* | 3/2013 | Berard | 707/707 |
| 2004/0186826 A1* | 9/2004 | Choi et al. | 707/3 |
| 2006/0190445 A1* | 8/2006 | Risberg et al. | 707/3 |
| 2007/0143265 A2* | 6/2007 | Risberg et al. | 707/3 |
| 2008/0072290 A1* | 3/2008 | Metzer et al. | 726/3 |
| 2008/0114628 A1* | 5/2008 | Johnson et al. | 705/7 |
| 2008/0154994 A1 | 6/2008 | Fischer et al. | |
| 2008/0243781 A1 | 10/2008 | Kuhr et al. | |
| 2009/0150431 A1 | 6/2009 | Schmidt et al. | |
| 2009/0150906 A1 | 6/2009 | Schmidt et al. | |
| 2009/0164790 A1* | 6/2009 | Pogodin | 713/176 |
| 2010/0095197 A1 | 4/2010 | Klevenz et al. | |
| 2010/0114841 A1* | 5/2010 | Holenstein et al. | 707/690 |
| 2010/0161616 A1* | 6/2010 | Mitchell | 707/741 |
| 2010/0269164 A1* | 10/2010 | Sosnosky et al. | 726/7 |
| 2010/0287553 A1 | 11/2010 | Schmidt et al. | |
| 2011/0010356 A1* | 1/2011 | Berard | 707/707 |
| 2011/0106770 A1* | 5/2011 | McDonald et al. | 707/661 |
| 2012/0030180 A1 | 2/2012 | Klevenz et al. | |

OTHER PUBLICATIONS

Content Management Interoperability Services, http://en.wikipedia.org/w/index.php?title=Content_Management_Interoperability_Services&oldid=509883812 (last visited Aug. 30, 2012).

Content repository API for Java, http://en.wikipedia.org/w/index.php?title=Content_repository_API_for_Java&oldid=476665273 (last visited Aug. 30, 2012).

SAP NetWeaver Information Lifecycle Management—http://www.sap.com/solutions/technology/enterprise-information-management/information-lifecycle-management/index.epx (last visited Aug. 30, 2012 3:26:54 PM).

SAP ARchiveLine: Overview—http://help.sap.com/saphelp_40b/helpdata/en/d7/e21b6a408e11d1896b0000e8322d00/content.htm (Last visted Aug. 30, 2012 3:27:53 PM).

* cited by examiner

ARCHIVE-SYSTEM-INDEPENDENT ARCHIVE-TYPE OBJECTS

TECHNICAL FIELD

This present disclosure relates to electronic data archiving, and, more particularly, to systems, software, and computer-implemented methods for providing an archive data entity compatible with multiple different archive systems and types.

BACKGROUND

Modern businesses increasingly replace paper records with electronic data. Additionally, the massive amounts of electronic records generated by businesses, families, and individuals in today's modern, computer-driven world have opened up new markets for storage of this data. Data archiving and back-up services have been developed providing users with a way to move electronic records from their local systems onto networks dedicated to providing safe and secure storage and access to these records. As one example, enterprise content management systems have been developed and are used, for example, to archive data objects of an enterprise software system.

The expanding use of electronic data archives assists in promoting a number of benefits. For example, electronic data archiving can reduce costs and errors associated with manual paper handling and processing, and paper storage, including the loss of such documents due to human error or disaster. Electronic record archiving also allows faster access to information by providing convenient online or networked access to information. In more sophisticated electronic record archiving systems, record security and access management functionality can be provided, assisting in securing the confidentiality, safety, and integrity of records maintained by the archive. Access control to electronic data can also assist in providing an audit trail relating to access and changes to a particular electronic record.

SUMMARY

This disclosure provides various embodiments for archiving a business object. At least one particular business object is identified for archiving. The particular business object has associated data including type data corresponding to a business object type of the at least one particular business object, structured business data, and unstructured attachment data. At least one archive-type object is created corresponding to the particular business object by enriching the unstructured attachment data with type-specific metadata including data identifying at least one attribute of the business object type. The archive-type object is archive-system-independent. The at least one archive-type object is exported to at least one archiving system for storage in at least one memory device of the archiving system.

While generally described as computer implemented software that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Figure 1:
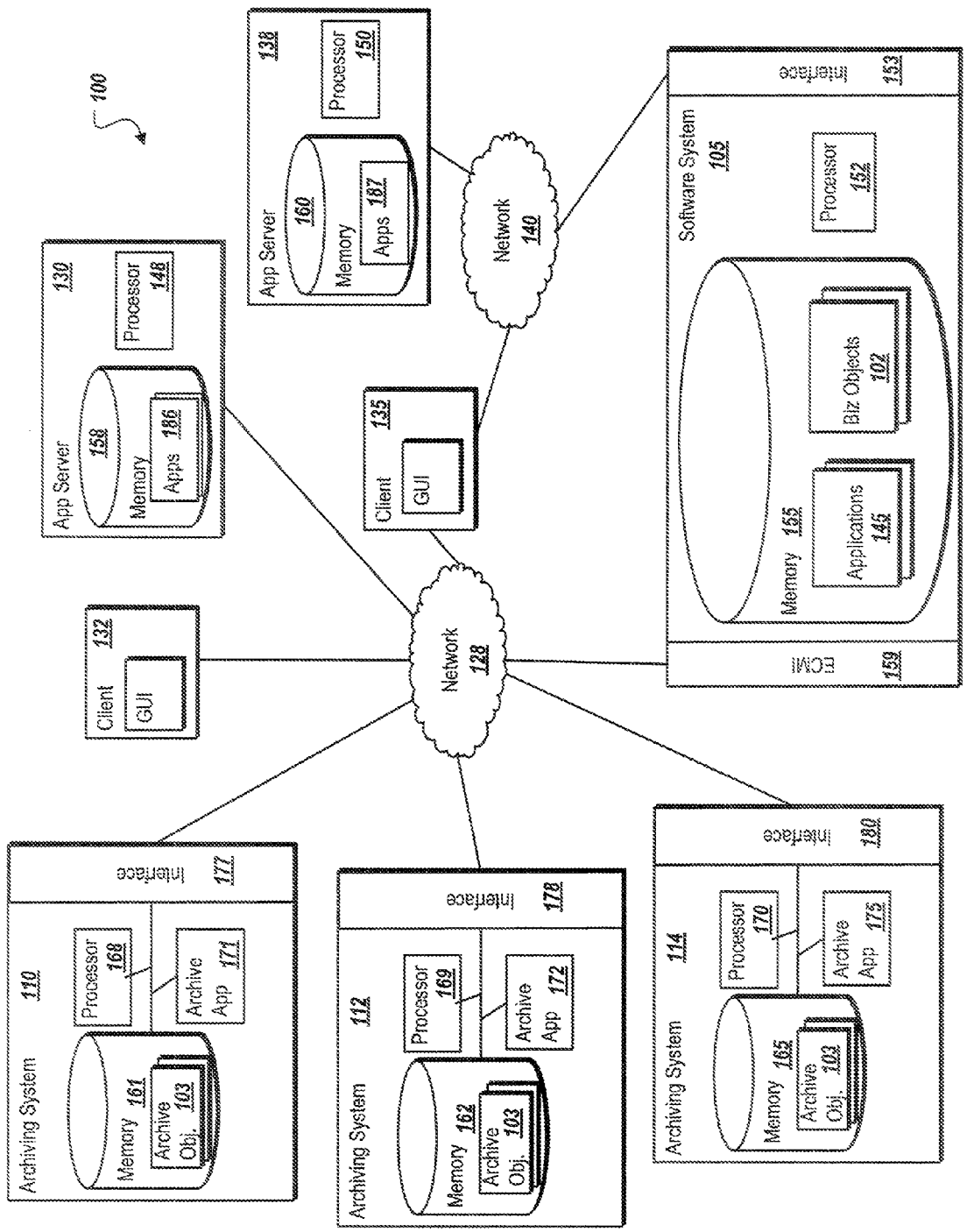
FIG. 1 illustrates an example system including an enterprise software system and archiving systems for storing business objects created by the enterprise software system.

This disclosure generally describes software, computer-implemented methods, and systems relating to the use of an improved archive-type data object in connection with archiving of a business object on an outside archiving system. As users generate data records using a particular software system, users may discover the need to archive some data records, for example, in order to free computing memory and resources. Typically, developers of a particular software system focus on developing, improving, and providing services directed to the core functionality and business of their respective software systems. While developer of a particular software system may foray into archiving systems intended for their particular systems, specialized, dedicated data archiving services have developed that provide more dynamic and sophisticated archiving alternatives, lessening the incentives to develop dedicated archiving platforms for particular software platforms. Moreover, software system customers may prefer, or have previous contracts or arrangements with third-party archiving services, making them averse to relying on a specialized, system-specific archiving service.

While the decoupling of "data-generating" systems and "data-archiving" systems yields important benefits, there are also troublesome considerations for using remote, or third-party archiving systems to archive data records produced by or for a particular software system. For instance, within enterprise software environments, enterprise software users may make significant investments and rely heavily on the enterprise software environment to provide solutions for many, if not all, of the enterprise user's needs. Consequently, a large portion of the data records of importance to the enterprise user may have been created by, used by, compatible with, or correspond to the enterprise software system. Additionally, loyal customers of a software system, including enterprise systems, often remain users of the system as it migrates to new versions and updates of various services, modules, other software components. Similarly, as the software system itself changes and matures, data records produced by the system can also change in format, type, and usage. Consequently, data records archived during the lifespan use of a particular software system can vary in type, versioning, format, and usage across this lifespan.

Users of a particular software system may find, despite the convenience of using a third-party archiving system, that some degree of coordination is desirable between a software system generating the user's electronic records and the archiving system storing the records. Moreover, coordination between a given software system and a particular archiving system increases in importance and value as users generate more and more data (that will eventually be archived), using a single software system. Additionally, some software systems, such as enterprise software systems, may produce strongly-typed data objects, including business objects, where the data typing and structure has particular significance within a particular software framework.

Software system managers and archive system service providers have attempted to re-couple separate data-generating and data-archiving systems in order to service the needs of mutual customers that desire a degree of interactivity and coordination between a given software system and one or more archiving systems. Considering that many archive systems archive data records in a generic format (in order to cater to a wide range of software application users) and the semantics of the record's corresponding application(s) are not known to the archive system, current solutions for increasing coordination between archive systems and software applications are limited and fraught with drawbacks. For example, one recent solution included maintaining relationships between related archived data objects by a convention-defined folder hierarchy, although the solution was limited to mapping only particular relationship types to the file hierarchy. Another issue afflicting previous attempts to coordinate between applications and archive systems is maintaining consistency, compatibility, and coordination between the systems over extended lifespans. For instance, where data is to be archived, for example, over the period of decades, updating coordination between the application and archive system can be troublesome and inconsistent, particularly as the application and its data conventions change and mature.

Another recent archive coordination solution included a software system creating a parallel search index for all archived data objects, where search queries executed through the software system could access the index to access and discover details of the archived objects. This solution resulted in a strong coupling and dependency between the software system and the archive system, requiring extensive, on-going maintenance in order to guarantee consistency and interoperability over the lifetimes of both the software system and archive system. In addition, initiatives have been started to assist in achieving interoperability between ECM repositories and various software systems. As an example, one such initiative includes the Content Management Interoperability Services (CMIS) specification.

An improved solution has been developed for systems with typed business data objects (or, simply, "business objects") that include attachment documents that, for example, include unstructured data. A unique archive-type data object can be constructed by combining the type information of a business object, the data of the business object itself, and the attachment of the business object. The archive-type object includes type-specific metadata corresponding to the type of the business object, including, in some instances, some of the data of the business object itself. The unstructured portion of the business object entity can be enriched with this metadata to form the archive-type object. The archive-type object can then be archived, and in some cases, replace the original business object. The application, or another user, can sometime later, access the archive-type object, extract the unstructured data and type-specific metadata, and reconstruct the original business object by referencing the business object type. The application need not maintain information about each business object, but only information regarding each business object type, including historical types. An application can identify the type of the archive-type object to identify characteristics of the type, and use these characteristics, and other metadata in the archive-type to perform operations on and complete transaction with the archived business data as well as, in some instances, rebuild, as completely as possible, a replacement version of the original business object.

FIG. 1 illustrates an example environment 100 including a software system 105 and one or more archiving systems 110, 112, 115 used to archive business objects 103 developed through, used with, developed for, or otherwise compatible with the software system 105. A software system 105, such as an enterprise software system, can communicate and send and receive data with one or more archiving systems 110, 112, 115 over one or more networks 128, including private and public networks. Additionally, one or more consumers 130, 132 of data archived by the archive systems 110, 112, 115 can communicate and exchange data with an archive system (e.g., 110) over a network 128. The software system 105 itself can be a consumer of an archive system. Additionally, consumers 135, 138 of the software system 105 can access and consume services provided by the software system over a network 140. For instance, software system 105 can be an enterprise software system hosting enterprise software services on one or more servers, to one or more consumers 135, 138 over a network 140. In some instances, networks 128 and 140 can be the same networks. A network (e.g., 128, 140) can be the internet.

The software system 105 can host one or more software applications 145 capable of generating business objects, to one or more consumers 135, 138. Business objects generated by the applications can be stored locally in memory of a consumer client device (e.g., 135, 138), or be stored in memory of a computing device of the software system 105. Consumers of the one or more applications, can be individual users (e.g., 135) on a client device or another software application or service (e.g., 138), including consumer applications hosted by one or more servers 138. Similarly, consumers 130, 132 of archive system services can include individual users accessing an archive system through one or more client devices (e.g., 132) or other software applications and services (e.g., 130), included those hosted by, and accessing an archive system through, one or more servers 130.

Each of the example servers 130, 138, including servers hosting applications and services of the software system 105 and operating in connection with archiving systems 110, 112, 114, can include a processor 148, 150, 152, 168, 169, 170. Each processor can execute instructions and manipulate data to perform the operations of the associated server, and may comprise, for example, a central processing unit (CPU), a blade, an application specific integrated circuit (ASIC), or a field-programmable gate array (FPGA), among other suitable options. Although each processor is illustrated as a single processor, multiple processors may be used in some instances according to the particular needs of the associated server. References to a single processor (e.g., 148, 150, 152) are meant to include multiple processors where applicable. The operations that each processor executes are determined by the purpose and operations of its associated server. Generally, a processor executes instructions and manipulates data to perform the operations of its respective server and, specifically, the software systems and applications hosted by the server (e.g., 105, 130, 138).

At a high level, each "server" (e.g., 105, 130, 138) includes one or more electronic computing devices operable to receive, transmit, process, store, or manage data and information associated with the environment 100. Specifically, a server is responsible for receiving requests from one or more clients and sending the appropriate response the requesting client. In addition to requests from external clients, requests may also be sent from internal users, external or third-party customers, other automated applications, as well as any other appropriate entities, individuals, systems, or computers. For example, although FIG. 1 illustrates a single server for consumers 130, 138, a server can be implemented using two or more servers, as well as computers other than servers, including a server pool. Indeed, a server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, servers may be adapted to execute any operating system, including Linux, UNIX, Windows, Mac OS, or any other suitable operating system.

In the case of the software system 105, one or more processors 152 can execute the functionality required to create business objects of various types, create archive-type data objects corresponding to the one or more business objects, and communicate with an archive system, including exporting archive-type objects to and retrieving stored archive-types objects from an archive system. Further, processors 152 of software system 105 can also execute the functionality required to serve software applications 145 and services to consumer clients 135, 138, as well as receive and respond to requests from consumers, including client applications 138, consuming services from the software system 105, for example, through an interface 153. Additional interfaces, such as an enterprise content management interface (ECMI) 159, can be dedicated for transaction between the software system 105 and one or more archiving systems 110, 112, 114. Regardless of the particular implementation, "software," including software "programs" and "applications," as well as enterprise software, provided by the software system 105 may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. Applications can be implemented as individual modules that implement the various features and functionality through various objects, methods, or other processes, or may instead include a number of sub-modules, third party services, components, libraries, and such, as appropriate. Conversely, the features and functionality of various components can be combined into single components as appropriate.

At a high level, each of the one or more applications, programs, or services 145 provided by a software system 105 can include any application, program, module, process, or other software that may execute, change, delete, generate, or otherwise manage information according to the present disclosure, particularly in response to and in connection with one or more requests received from the illustrated clients 108, as well as other applications. In certain cases, only one hosted application may be located at a particular server. In others, a plurality of related and/or unrelated hosted applications may be stored at a single server, or located across a plurality of other servers, as well. In certain cases, software system 105 may implement a composite hosted application. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the software system 105 can serve or otherwise provide web-based applications accessed and executed by remote clients 135 or client applications 138 via the network 140 (e.g., through the Internet). Further, one or more processes associated with a particular software system application 145 may be stored, referenced, or executed remotely. For example, a portion of a particular hosted application 145 may be a web service associated with the application that is remotely called, while another portion of the hosted application 145 may be an interface object or agent bundled for processing at a remote client 135, 138. Moreover, any or all of the hosted applications 145 may be a child or sub-module of another software module or enterprise application (not illustrated) without departing from the scope of this disclosure. Still further, portions of the hosted application 145 may be executed by a user working directly at server 138, as well as remotely at client 135.

Each of the example servers 105, 130, 138 and archive systems 110, 112, 115 can also include a memory 155, 158, 160, 161, 162, 165. Each memory may include any memory or database module and may take the form of volatile or non-volatile memory including, without limitation, non-transitory memory elements, magnetic media, optical media, random access memory (RAM), read-only memory (ROM), removable media, or any other suitable local or remote memory component. Each memory may store various objects or data, including classes, frameworks, applications (e.g., 186, 187), backup data, business objects, jobs, web pages, web page templates, database tables, content repositories storing business or other dynamic information, or other information including any parameters, variables, algorithms, instructions, rules, constraints, or references thereto relevant to the purposes of the particular server. Each memory may also include any other appropriate data, such as VPN applications, firmware logs and policies, firewall policies, a security or access log, print or other reporting files, as well as others. Again, the particular data and instructions stored in each memory will be described in detail below in connection with the illustrated implementations of the software environment 100 and components thereof.

Archive systems 110, 112, 114 can provide storage and archiving services within a wide array of environments, including document management, records management, web content management, digital asset management, email management and information lifecycle management. An example archive system includes memory (e.g., 161, 162, 165), for instance, within the context of servers in a server farm. Servers within an archiving system can include the same features, components, and technologies described above for servers generally. For instance, each archiving system 110, 112, 114 can include one or more processors 168, 169, 170 as well as archive services applications 172, 173, 175 that provide archive related operations and services to customers of the archive systems 110, 112, 114. Additionally, in some instances, archiving systems can additionally include interfaces 177, 178, 180 for receiving and communicating with users, systems, and applications interfacing with the archiving systems 110, 112, 114.

Generally, the network 128, 140 facilitates wireless or wireline communications between the components of the software environment 100 (e.g., between the software system 105, clients 130, 132, 135, 138, archive systems 110, 112, 115, as well as between other components as appropriate), as well as with any other local or remote computer, such as those associated with the one or more applications 130, 138. The network 128, 140 can be implemented as one or more distinct networks. In any implementation, the network 128, 140 may be a continuous or discontinuous network without departing from the scope of this disclosure, so long as at least a portion of the network 128, 140 may facilitate communications between senders and recipients. The network 128, 140 may be all or a portion of an enterprise or secured network. As an example, a networks (e.g., 140) may represent a portion of an enterprise network, while another network (e.g., 128) represents a connection to the Internet. In some instances, a portion of the network 128, 140 may be a virtual private network (VPN), such as, for example, the connection between a software services consumer, such as clients 135, 138, and the software system 105. All or a portion of the network 128, 140 can comprise either a wireline or wireless link. Example wireless links may include 802.11a/b/g/n, 802.20, WiMax, and/or any other appropriate wireless link. In other words, the network 128, 140 encompasses any internal or external network, networks, sub-network, or combination thereof operable to facilitate communications between various computing components inside and outside the illustrated environment 100. The network 128, 140 may communicate, for example, Internet Protocol (IP) packets, Frame Relay frames, Asynchronous Transfer Mode (ATM) cells, voice, video, data, and other suitable information between network addresses. The network 128, 140 may also include one or more local area networks (LANs), radio access networks (RANs), metropolitan area networks (MANs), wide area networks (WANs), all or a portion of the Internet, and/or any other communication system or systems at one or more locations.

The illustrated implementation of FIG. 1 includes one or more local and/or remote clients 130, 132, 135, 138. A client is any computing device operable to connect or communicate at least with the software system 105, an archive system 110, 112, 115, and/or the network 128, 140 using a wireline or wireless connection. Clients can include a graphical user interface or GUI. In general, a client comprises an electronic computing device operable to receive, transmit, process, and store any appropriate data associated with the software environment of FIG. 1. It will be understood that there may be any number of clients associated with environment 100, as well as any number of clients external to environment 100. Further, the term "client," "consumer," and "user" may be used interchangeably as appropriate without departing from the scope of this disclosure. Moreover, while each client is described in terms of being used by one user, this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device. For example, the client 108 may comprise a computer that includes an input device, such as a keypad, touch screen, mouse, or other device that can accept information, and an output device that conveys information associated with operations of one or more applications, including applications stored and/or executed on the software system 105 (or other servers in environment 100), or on the client 108 itself, including digital data, visual information, or the GUI. Both the input device and the output device may include fixed or removable storage media such as a magnetic computer disk, CD-ROM, or other suitable media to both receive input from and provide output to users of the clients.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
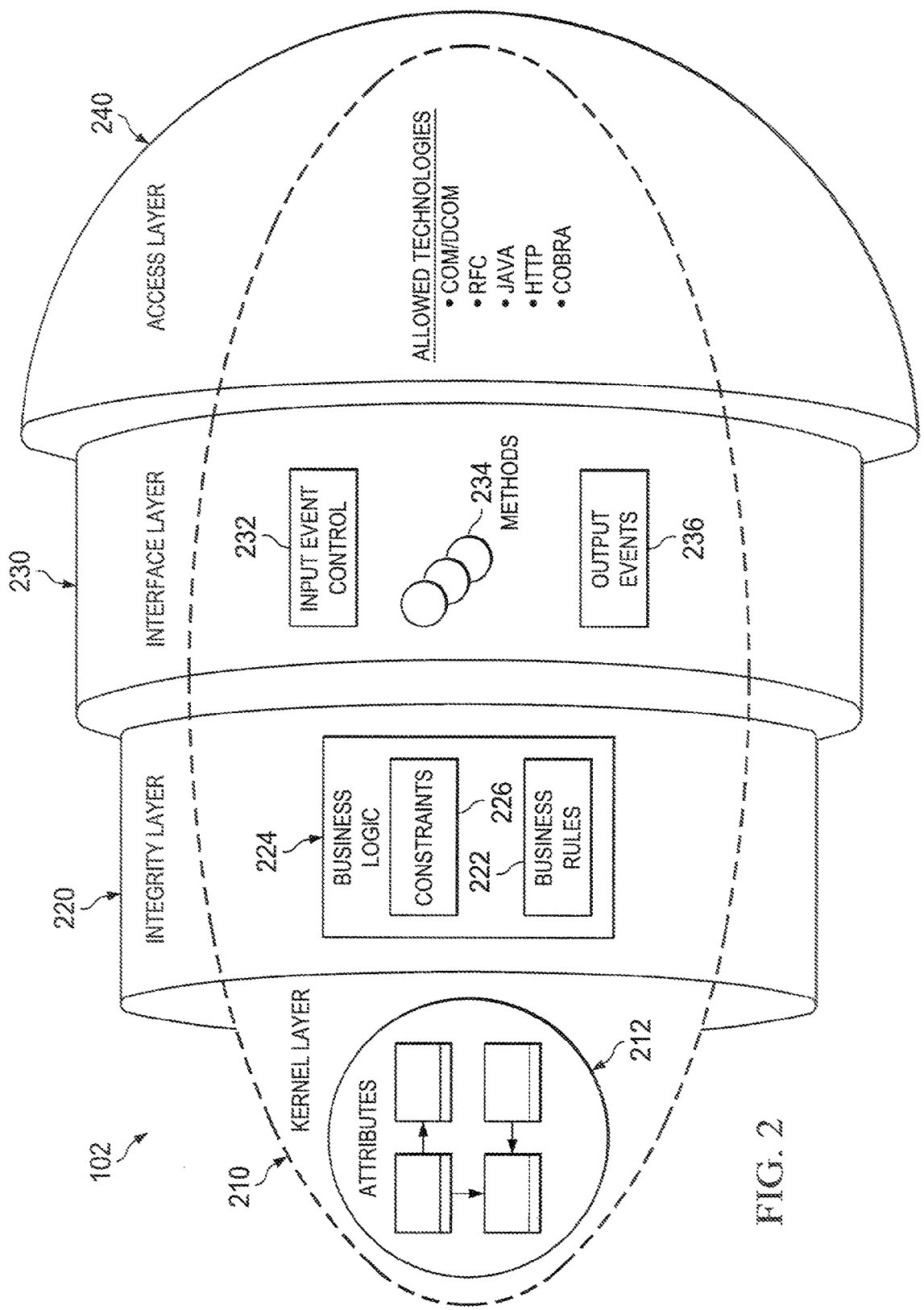
FIG. 2 is a schematic representation of the structure of an example, generic business object.

As noted above, a software system (e.g., 105), including enterprise software systems, can generate, create, utilize, process, and archive business objects. As an example, FIG. 2 illustrates the structure of an example, generic business object 102 in environment 100. In general, the overall structure of the business object model ensures the consistency of the interfaces that are derived from the business object model. The derivation helps ensure that the same business-related subject matter or concept can be represented and structured in the same way in various interfaces. The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

Each business object is thus a capsule with an internal hierarchical structure, behavior offered by its operations, and integrity constraints. Business objects are generally semantically disjointed, i.e., the same business information is represented once. In some embodiments, the business objects are arranged in an ordering framework such that they can be arranged according to their existence dependency to each other. For example, in a modeling environment, the customizing elements might be arranged on the left side of the business object model, the strategic elements might be arranged in the center of the business object model, and the operative elements might be arranged on the right side of the business object model. Similarly, the business objects can be arranged in this model from the top to the bottom based on defined order of the business areas, e.g., finance could be arranged at the top of the business object model with customer relationship management (CRM) below finance and supplier relationship management (SRM) below CRM. To help ensure the consistency of interfaces, the business object model may be built using standardized data types as well as packages to group related elements together, and package templates and entity templates to specify the arrangement of packages and entities within the structure.

A business object may be defined such that it contains multiple layers, such as in the example business object 102 of FIG. 2. The example business object 102 contains four layers: the kernel layer 210, the integrity layer 220, the interface layer 230, and the access layer 240. The innermost layer of the example business object is the kernel layer 210. The kernel layer 210 represents the business object's 102 inherent data, containing various attributes 212 of the defined business object. The second layer represents the integrity layer 220. In the example business object 102, the integrity layer 220 contains the business logic 224 of the object. Such logic may include business rules 222 for consistent embedding in the environment 100 and the constraints 226 regarding the values and domains that apply to the business object 102. Business logic 224 may comprise statements that define or constrain some aspect of the business, such that they are intended to assert business structure or to control or influence the behavior of the business entity. It may pertain to the facts recorded on data and constraints on changes to that data. In effect, business logic 224 may determine what data may, or may not, be recorded in business object 102a. The third layer, the interface layer 230, may supply the valid options for accessing the business object 102 and describe the implementation, structure, and interface of the business object to the outside world. To do so, the interface layer 230 may contain methods 234, input event controls 232, and output events 236. The fourth and outermost layer of the business object 102 in FIG. 2 is the access layer 240. The access layer 240 defines the technologies that may be used for external access to the business object's 102 data. Some examples of allowed technologies may include COM/DCOM (Component Object Model/Distributed Component Object Model), CORBA (Common Object Request Broker Architecture), RFC (Remote Function Call), Hypertext Transfer Protocol (HTTP) and Java, among others. Additionally, business objects 102 of this embodiment may implement standard object-oriented technologies such as encapsulation, inheritance, and/or polymorphism. Business object type data can identify or specify object-type-specific parameters, attributes, and metadata, including data describing, defining, or identifying the layers (e.g., 210, 220, 230) and logic (e.g., 224) of business objects of the particular type, including other characteristics of the business object type.

Figure 3:
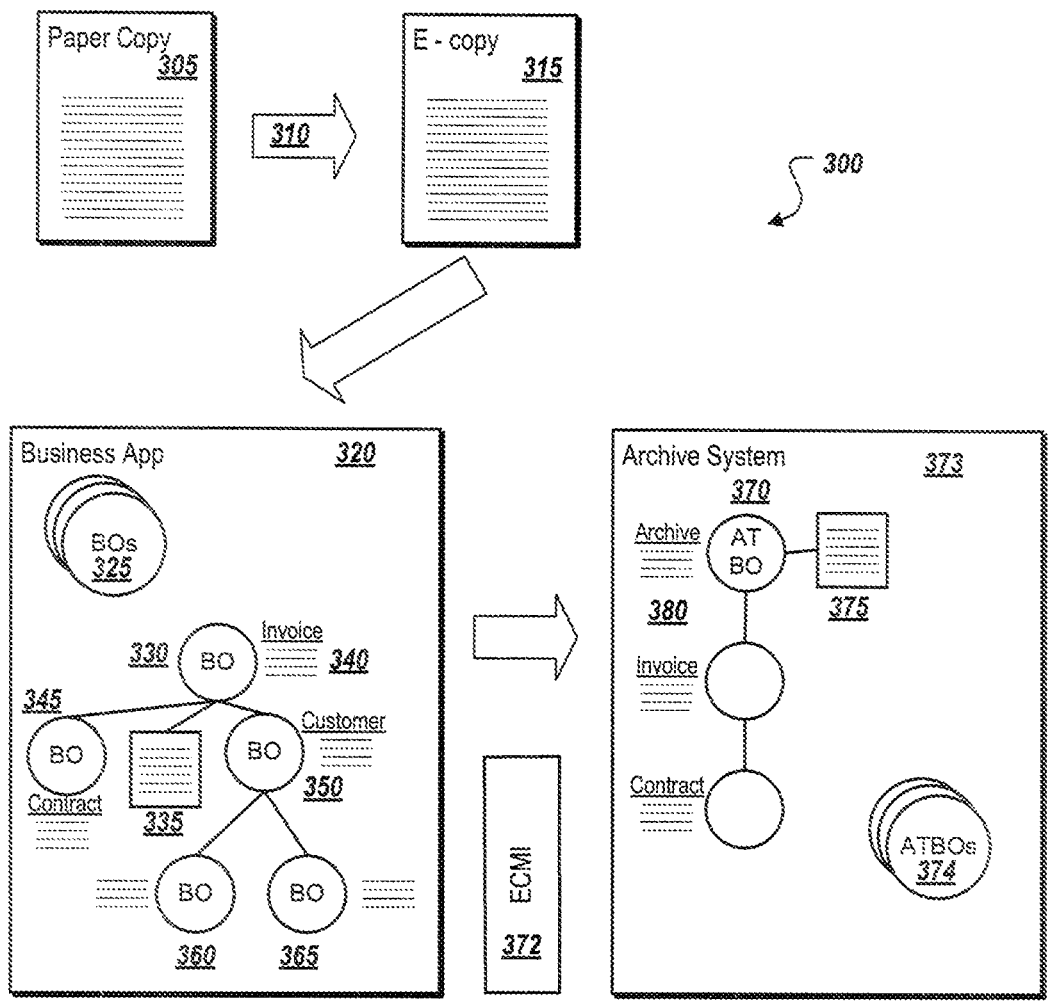
FIG. 3 is a schematic illustration of an example lifecycle of data created by a software system and archived at an example archive system.

In some instances, unstructured data can be added to, included in, or otherwise associated with a typed business object. Turning now to FIG. 3, a flowchart 300 is shown illustrating the creation of a new (or modification of an existing) business object. In some instances, a business will obtain hard copies of various documents, pictures, products, or things that it desires to record, save, or store electronically. For instance, in the example of FIG. 3, a paper invoice 305 can be received by a business consumer of a business software service 320. The paper invoice 305 can be scanned 310 to create a PDF copy 315 of the invoice. In some instances, optical character recognition (OCR) can also be performed on the PDF copy 315 to create metadata, specific to the PDF copy 315, relating to the OCR.

In the example of FIG. 3, the business software service hosts a particular business application 320 that utilizes one or more business objects 325. In this example, one of the available business objects is an invoice-type business object. In some instances, the receipt of a paper invoice 305 and generation of a PDF copy 315 of the invoice, can lead to the creation or modification of a particular invoice-type business object 330. The PDF copy 315 of the invoice, in this example, includes unstructured data, being a scanned image of the paper copy 305. The PDF copy 315 can be included in, assigned to, linked to, or otherwise associated 335 with a corresponding instance 330 of the invoice business object 330 corresponding to the real-world invoice 305. An invoice business object of the invoice can additionally include fields and structured business data 340 relating to the real world invoice. For instance, business data fields can include an order number, customer name and/or ID, invoice amount, etc. In some implementations, certain key business data fields can be defined for a business object of type invoice.

Further, in addition to associating an unstructured data attachment 345 to the invoice business object 330, further relationships can be defined for the business object. In some instances, these structural relationships and/or dependencies can be business object type-specific (e.g., relationships shared by all invoice-type objects). For instance, relationships can be defined that identify related business objects linked to, included in, dependent upon, or otherwise associated with the invoice business object 330. For instance, a contract-type business object 345, that represents a real-world contract, can be associated with the invoice business object 330. The contract-type business object 345 may, for example, relate to the real-world contract for goods to which the real world invoice 305 relates. Additionally, in this example, a customer-type business object 350 can additionally be identified as associated with the invoice business object 330. Each of the dependent business objects 345, 350 can also include business data 355, as well as further structural dependencies (e.g., 360, 365). In this sense, a business object can have a hierarchical, or multi-dimensional structure. Such a structure can complicate archiving of the object.

Using an archive-type object, certain structural relationships, structured business data, and business object type data can be condensed, consolidated, flattened, or otherwise simplified and associated with any unstructured data (e.g., attachment 315) to form a archive-type object 370 corresponding to the original business object 330. The business application 320 can perform this conversion from the business object 330 to the corresponding archive-type object 370. In other instances, other modules or systems associated with the business application 320 can convert business objects 330 into archive-type objects. In some instances, the business application 320 is one of a plurality of business applications or service provided within an enterprise software system. The enterprise software system can include a centralized conversion tool that converts business objects into archive-type objects. Indeed, in some implementations, an electronic content management integrator (ECMI) 372 can be provided that can be used by a business application or corresponding enterprise software system, to interface the software system with one or more outside archive systems. The ECMI 372 can we provide an infrastructure, integration layer and abstraction to connect to archive stores and their type system or data dictionary. Indeed, in some instances, the ECMI 372 can, itself, provide the archiving conversion functionality for creating archive-type objects, for transmission to and storage in a particular outside archive system 373. The ECMI 372 can also as the interface for retrieving archive-type objects 374 or metadata information of archive-type objects from the outside archive system 373.

As condensing unstructured data can be troublesome by nature, the unstructured data may be stored substantially whole, as an archive-quality file 375. For instance, an archive format such as PDFA can be employed. The unstructured data document can then be enriched by supplemental, type-specific data, or metadata 380, that ties at least the business object type of the unstructured data's associated business object to the unstructured document. In some instances, the metadata 380 can include data relating to and/or identifying structural relationships of the associated business object or the associated business object's type. In still other examples, the metadata can include flattened business object data. In each instance, sufficient metadata 380 can enrich the unstructured data portion 375 to allow a software system to reconstruct or perform transactions relating to the original business object 330 upon which the particular archive-type object 270 is based. For instance, business object type data can be identified in the enriched archive-type object 270. Knowing the business object type of the underlying business object can allow a system, in some instances, to determine the structure of the underlying business object, as well as the unstructured data's relationship thereto.

Figure 4A:
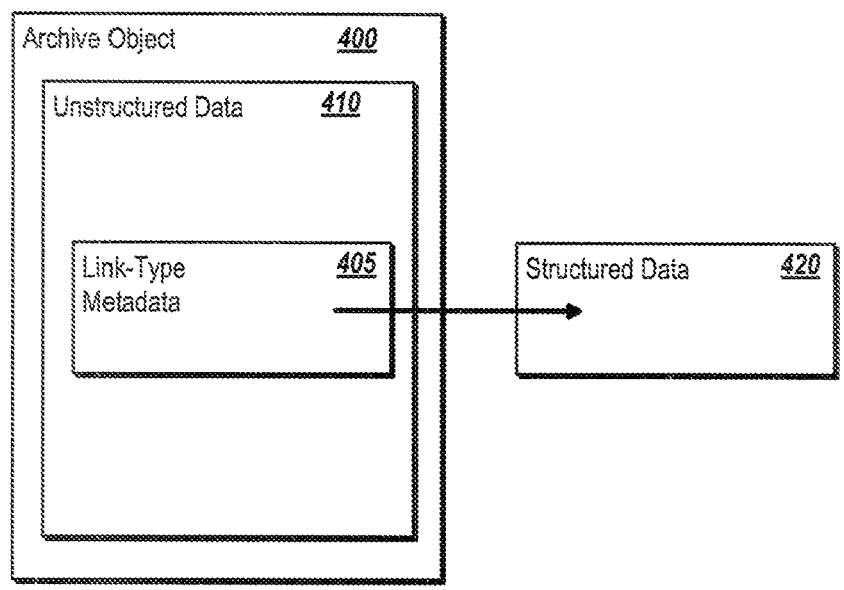
FIG. 4A is a representation of an example first use-case of an archive-type data object.

There are many ways metadata 380 of an archive-type object 370 can be used to reconstruct the business object 330 upon which the archive-type object 370 is based. This can depend, for instance, on the particular business object type of the archive object's 370 underlying business object. Additionally, different formats and content can be included in the metadata 380 of the archive-type object. The format of the metadata can vary on a business-object-type-basis or vary by virtue of the particular metadata use case employed when building or implementing an archive-type object. FIG. 4A shows a first example of an archive-type object use case. An archive-type object 400 is shown that employs link-type metadata 405. Unstructured data 410, is included in the archive-type object 400, and stored in an archive system, such as an enterprise content management (ECM) system. The unstructured data 410 can be enriched with the link-type metadata 405. The link-type metadata can provide a reference, link, or address of the unstructured data's corresponding, associated business object or archived business object data 420.

In examples similar to the link-type case illustrated in FIG. 4A, multiple levels of archiving of a business object can be provided. For instance, a particular business object can have a near-term archive cycle and long-term archive cycle. During the near-term archive cycle, structured data of the associated business object can be maintained by and/or on its corresponding software system. For instance, during a near-term archive cycle, only unstructured data may be archived, while the structured business data of the business object is maintained in its original, un-archived form, minus its associated, now-archived unstructured attachments 410. In this particular "near-term" case, the link-type metadata can point to the business object as it is referred to, located on, or addressed by the software system. As the business object's lifecycle progresses, it may be determined that the remainder of the business object (e.g., the structured data, structural relationship data, etc.) can be additionally archived. At this point, the metadata of the archived unstructured data can be updated to indicate the nature and location of the archived structured business object data. In some instances, the unstructured and structured data can be archived on the same archive system, the link-type metadata of the unstructured data indicating a location of the structured data on the archive system. Similarly, structured data can also include link-type metadata pointing to the business object's associated, archived unstructured data. In other implementations, the structured business object data can archived in an archive system distinct from the archive system archiving the unstructured data. As in the example above, link-type metadata of the archived unstructured data, or archived structured data, can point to the location of the associated, respective structured/unstructured data.

Third-party applications, as well as the parent software system of the business object, can identify, from the link-type metadata of an archive unstructured data part or structured data part, the location and identity of the remainder of the business object. Accordingly, applications can use the data to locate, access, retrieve, and/or call the unstructured and structured elements of a business object, using link-type metadata. In some instances, the link-type metadata can also identify the business object type of the underlying business object. The business object type may be used, in further examples, to assist in determining how the link-type metadata is to be read and processed, or how unstructured and structured business object data might be "linked" or recombined upon access the data from the archive system. Additionally, archive systems themselves can identify the business object type from the metadata 405. An archive system can use metadata, for instance, to automatically convert or update references between archived unstructured attachment and the archived business objects. Additionally, the format of the link-type metadata can be archive-system-independent, with portions of the metadata parsable by multiple different archive systems. For instance, archive systems can access and parse link-type metadata identifying the general business object type of the business object as well as an identification of link information, such as a particular extension for structured business data associated with an unstructured attachment record archived by the archive system.

Figure 4B:
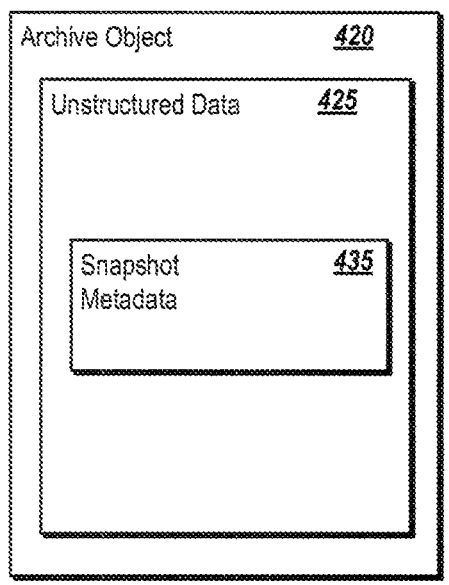
FIG. 4B is a representation of an example second use-case of an archive-type data object.

FIG. 4B shows a second example use case of an archive-type business object 420. As in the link-type use case example described in connection with FIG. 4A, a snapshot-type case that also include enriching an archive-file version of an unstructured data attachment 425 of a particular business object. The unstructured data 425 is again enriched with metadata 435, except in this example, rather than including or otherwise being based on link-type metadata, the snapshot-type case includes snapshot metadata that includes at least a portion of relevant business data of a business case relating to the business object type of the business object. For instance, the metadata 435 can include information directed to the object's related business objects and their attributes. Snapshot metadata can further include business object type information. In some instances, snapshot metadata 435 can include selected elements of structured business data from the business object, as well as those business object to which the business object is related. Additionally, the particular metadata 435 collected or generated for a particular business object can depend on its type. For instance, a business object of one type can include metadata relating to values of certain type-specific fields included in business objects of that respective type. The business object snapshot type metadata can be transferred together with the generated unstructured data attachment file (e.g., a printed document, metadata-enriched PDFA file, etc.) to an archive system.

The metadata 435 can be generic and include some values that are widely, if not universally, understood by various third-party data archiving systems and archive applications. For instance, with the snapshot-type metadata made available to the archive system it is possible to use third party data archive applications (e.g., provided by the archive system itself) to search, evaluate, or otherwise perform tasks using business object data included in the metadata 435. For instance, in an example of an invoice-type business object that has been archived in a snapshot archive-type object 420, a third-party archive search engine can be used to search within an archive system for a particular invoice. For instance, the query may search for a business object (in this case, within the snapshot metadata of archive-type objects stored in the archive system) relating to an invoice created in 1997 for customer X. In this example, structured business object data from the invoice-type business object can include Date data and Customer data, and a software system may create an archive-type object for a particular instance of, or all instances of, an invoice-type business object, where snapshot metadata is to include certain key business data fields, including the Date data and Customer data. In addition, an unstructured attachment relating to the invoice (such a scanned PDF copy of the corresponding paper invoice) can be converted into an archive format (e.g., PDFA), and enriched with snapshot metadata including an identification of the corresponding business object's type and, in this particular example, the Date and Customer data, among other data pertaining to the particular business object or its business object type. While the archive system may not be capable of searching the unstructured data to discover invoices involving customer X from 1997, the archive system, or archive search software, can access, make sense of, and search the snapshot-type metadata that includes parsable fields identifying an invoice-type object, and date and customer relating thereto. The search can thereby return the enriched unstructured data as well, in that the unstructured data file 425 includes, points to, in enriched with, or is otherwise identified as being associated with the identified metadata of the archived business object.

With a snapshot-type archive object, an archive system can remain completely decoupled from an business object's related business applications while still being able to access and interpret certain important business data, meta data and attachments of business objects' archive-type objects stored in the archive system. Link-type archive objects can also provide a solution that decouples an archive system from a business object's business application, while still allowing the archive system to identify metadata values, that can be forwarded to a user or business application, for use in identifying relationships between archived unstructured data and (archived and un-archived) structured business object data. In either context, this can be realized using archive-type documents enriched by business-object-related metadata that includes business object type data.

Figure 5:
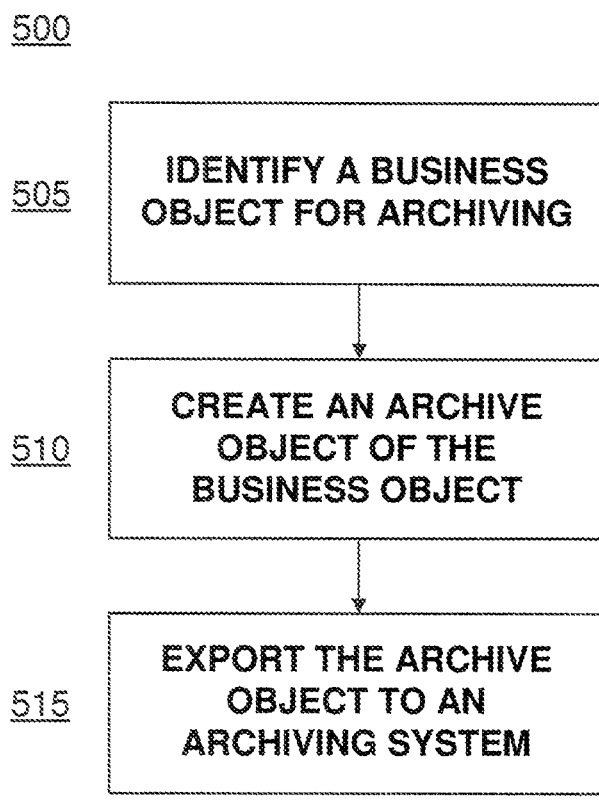
FIG. 5 is a flowchart illustrating an example computer process for archiving a business object.

Turning to FIG. 5, a flowchart 500 illustrates an example computer process for archiving a business object. At least one particular business object is identified 505 that is designated for archiving. A user or computing system, including software applications executed on the computing system, may designate the business object for archiving. Additionally, a business object can be designated for archiving automatically, for example, according to a predetermined schedule or lifespan of a business object. For instance, business object records may be archived after being designated as "closed" and/or after a period of time elapses for local storage of the business object record on its associated business software application system. The business object can have associated data including type data corresponding to the business object's object type, structured business data, and unstructured attachment data. At least one archive-type object can then be created 510 corresponding to the identified business object. The archive-type object can be created, for example, by enriching the unstructured attachment data with type-specific metadata including data identifying at least one attribute of the business object type. The archive-type object can then be exported 515 to at least one archiving system for storage in at least one memory device of the archiving system. Archive-type objects of business objects of a given business software system can be archived in any one of a plurality of archive systems. Indeed, the at least one archive-type object can be archive-system-independent, allowing it to be stored in any one of a variety of different archive systems, including archive systems remote from the business application system associated with the business objects, or third-party archiving systems, such as ECM archiving systems.

Multiple different clients, applications, and users can initiate the creation of archive-type objects corresponding to business objects to which they have access. A single user or application can control exportation of the archive-type object. For instance, a user (such a business) can specify which archiving system should store the archive-type object. In some instances, a single user or entity can store various (or the same) archive-type objects on multiple archiving systems. Additionally, users of a software system, such as an enterprise software system, are likely to generate, use, or otherwise access many different business objects with many different business object types. In some instances, the archive-type object can be considered to have a single type—the archive type. In this sense, a first archive-type object can be the archived version of a first business object type and a second archive-type object the archived version of a second business object type. While the first and second business object types may vary significantly in terms of their structure, the basic structure of both the first and second archive-type objects may be substantially similar. In some instances, an archiving system may regard the first and second archive-type objects as having the same type. However, an archiving system can "identify" the type of the underlying, archived business object by parsing the type-specific metadata of the archive-type object.

Figure 6:
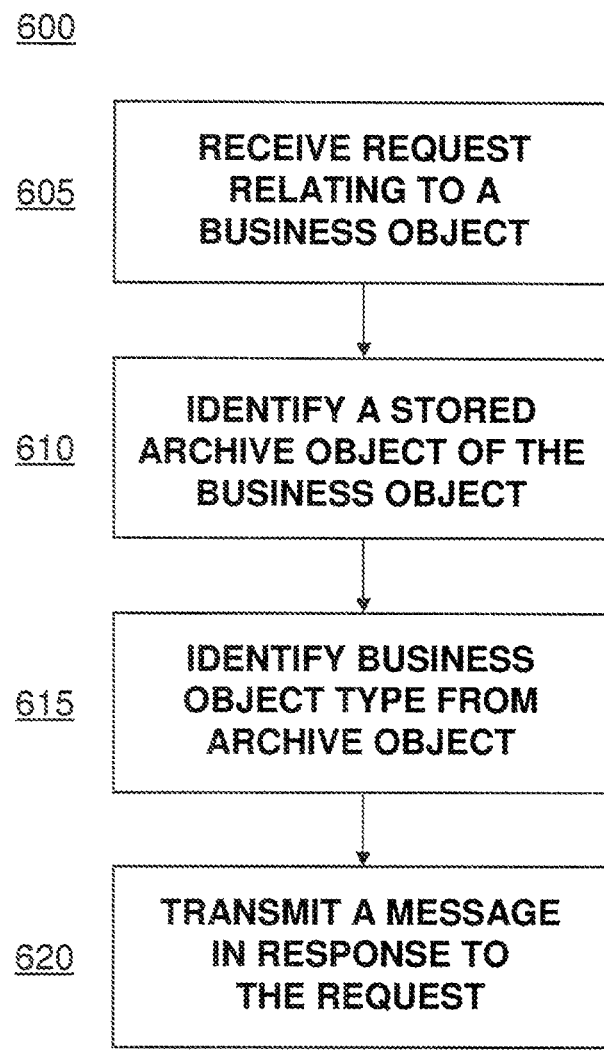
FIG. 6 is a flowchart illustrating an example computer process for providing access to an archive-type object corresponding to an archived business object.

Turning to FIG. 6, a flowchart 600 is shown illustrating an example computer process for providing access to an archive-type object corresponding to an archived business object. A request from a remote computing device can be received 605 at a data archiving system relating to a particular business object originally created by a data processing system distinct from the data archiving system and archived on the data archiving system. At least one particular archive-type object can be identified 610 in response among a plurality of archive-system-independent archive-type data objects stored in the data archiving system. The identified archive-type object can be identified as corresponding to the particular business object. The archive-type object can include unstructured attachment data and type-specific metadata, such as the metadata described in connection with examples of FIGS. 3, 4A, and 4B, and include data identifying at least one attribute of a business object type of the particular business object. The archive system can further identify 615 the business object type of the at least one particular business object from the metadata. A message can be transmitted 620 to the remote computing device, in response to the received request 605, the message including metadata values of the type-specific metadata and indicating at least one type-specific attribute of business object data of the particular business object.

Requests 605 received by an archiving system can be directed to a wide variety of tasks or services involving the archive-type objects stored by the archiving system. For instance, the request 605 can be a search query, received from an application, a user, or an administrator of the software system to which the archived object "belongs," seeking to discover a particular archive-type object of a relating archived business object. The type of the business object can be used in such a search. As another example, a request can be directed to retrieval of a copy of the archive-type object by an application, user, etc. The application, or software system, with knowledge of the structure of the business object type of a retrieved archive-type object, can attempt to access, perform operations on, complete transactions with, or rebuild the original business object from the archive-type object. The request 605 may merely seek information concerning a particular archive-type object, for example, to retrieve certain structured or unstructured data archived by the archive-type object and stored in the archived system. This structured or unstructured data can then be used by the outside application or system. As still another example, the request 605 can be directed to updating or otherwise modifying metadata stored in the archive-data object. For instance, an archive-type object, instead of replacing the original business object, may be a duplicate copy of the original business object. Accordingly, it can be desirable to update metadata in the archive-type object in accordance with changes to the underlying business object.

Figure 7:
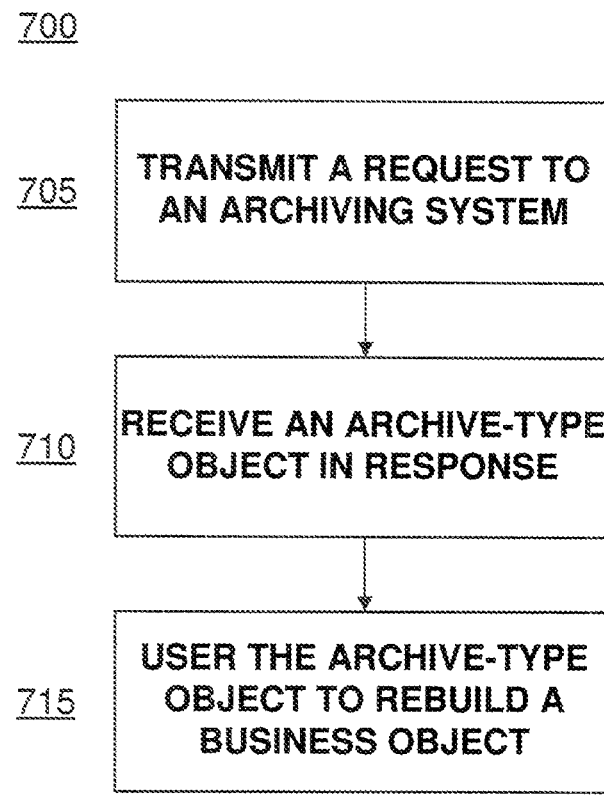
FIG. 7 is a flowchart illustrating an example computer process for completing a transaction using an archived business object.

Turning to FIG. 7, a flowchart 700 is shown illustrating an example computer process for completing a transaction using an archived business object. A request is transmitted 705 to a data archiving system relating to an archived version of at least one particular business object. The archived version of the at least one particular business object can include type data corresponding to a business object type of the at least one particular business object, structured business data, and unstructured attachment data. At least one archive-type data object can be received 710 in response to the request. The archive-type data object corresponds to the at least on particular business object and can include the unstructured attachment data of the particular business object, and type-specific metadata including data identifying at least one attribute of the business object type of the at least one particular business object. The type-specific metadata can then be used 715 to rebuild at least some of the structured business data of the at least one particular business object. In some instances, rebuilding the structured business data 715 can include generating a new business object and populating the new business object with structured business data extracted or rebuilt from the archived business object.

Figure 8:
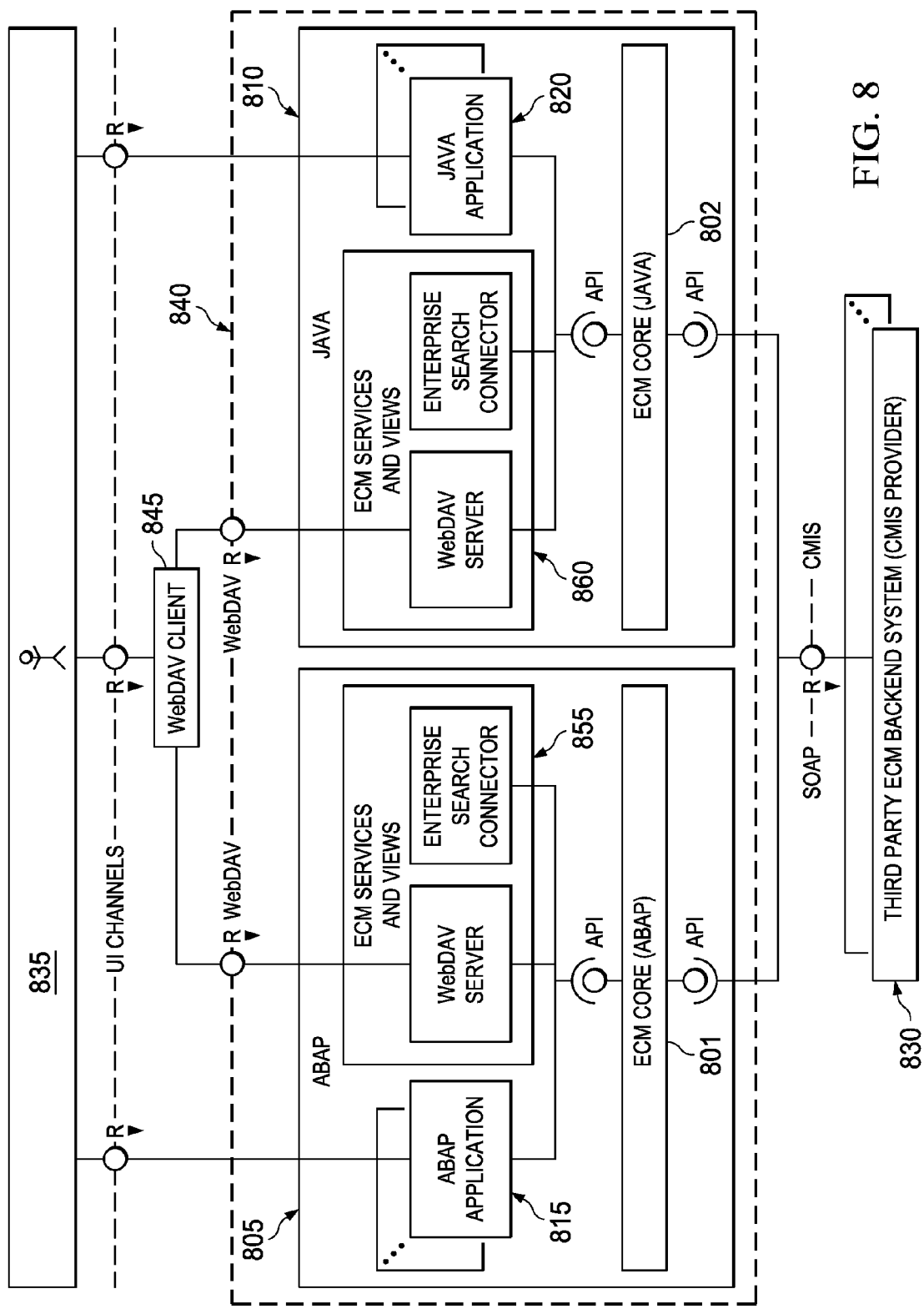
FIG. 8 is a schematic representation of an example enterprise content management integration framework implemented in an example software environment.

Turning now to FIG. 8, as noted in connection with the discussions of FIGS. 1 and 3, an ECMI layer can be provided to assist in providing an interface between a software system generating business objects, and one or more outside archive systems. FIG. 8 is a schematic illustration of an example implementation of an ECMI layer. An ECMI layer can be provided by the developer or manager of a business software system as a compromise for providing a full-blown ECM solution. The ECMI layer can assist in providing seamless interoperability between the business software and outside archive systems storing archive-type objects of business objects of the business software.

In the particular example illustrated in FIG. 8, the ECMI layer 801, 802 is implemented on a system 800 including ABAP 805 and Java 810 stacks. Each stack includes one or more applications 815, 820 In this particular example, the ECMI 801, 802 is implemented in parallel for each stack so that it can be used on both stacks independently. The ECMI layer 801, 802 interfaces with the applications 815, 820 allowing archived data transactions to be performed between the applications 815, 820 and one or more third-party archive systems 830. Transactions can include sending and retrieving archive-type objects between the applications 815, 820 and archive systems 830, as well as sending requests to an archive system 830 for data relating to archive-type objects stored on the archive system 830.

Users 835 of the enterprise software environment 840 can access the applications 815, 820 of the enterprise system 850 over a network, for example, through one or more UI channels, including through a WebDAV client 845. In addition to accessing, using, and interfacing with applications 815, 820 in the enterprise system 850, a user 835 can additional interface with archive systems 830 through an ECM Services and Views tool(s) (e.g., 855, 860) and interface provided through the enterprise software environment 840. Accordingly, an ECMI layer 801, 802 can facilitate interactions and transactions between one or more outside archive systems and business applications 815, 820 as well as particular users 835, or subscribers, of an enterprise software environment providing the ECMI. Additionally, the ECMI layer can include functionality for building archive-type objects from business objects generated using the enterprise software environment 840. While FIG. 8, illustrates one particular example of an ECMI layer and interactions between a software system 840 and third-party archive systems 830, this in a non-limiting example for purposes of illustration only. Indeed, other interfaces, architectures, programs, and modules can be employed, in connection with or outside of either the software system 840, archive system 830, or both, to provide the functionality allowing archive-type objects to be created and transmitted between a software system and a third-party archive system.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures does not necessarily require the particular order shown, or sequential order, to achieve the desired results. In certain implementations, multitasking and parallel processing may be advantageous. Other variations are within the scope of the following claims.

What is claimed is:

1. A computer-implemented method of archiving business objects, the method comprising:

identifying at least one first business object for archiving, the at least one first business object having associated data including:

type data corresponding to a first business object type of the at least one first business object, first structured business data, and first unstructured attachment data comprising an electronic version of a printed document;

creating at least one first searchable archive-type object corresponding to the at least one first business object by enriching the first unstructured attachment data with first type-specific metadata including data identifying at least one attribute of the first business object type and including the enriched first unstructured attachment data in the at least one first archive-type object, the at least one first searchable archive-type object searchable based on the enrichment to the first unstructured attachment data;

exporting the at least one first archive-type object that includes the enriched first unstructured attachment data to at least one archiving system for storage in at least one memory device of the archiving system, wherein the at least one first archive-type object is archive-system-independent;

identifying at least one second business object for archiving, the at least one second business object having associated data including:

type data corresponding to a second business object type of the at least one second business object, second structured business data, and second unstructured attachment data comprising an electronic version of another printed document;

creating at least one second archive-type object corresponding to the at least one second business object by enriching the second unstructured attachment data with second type-specific metadata including data identifying at least one attribute of the second business object type and including the enriched second unstructured attachment data in the at least one second archive-type object; and exporting the at least one second archive-type object that includes the enriched second unstructured attachment data to at least one archiving system.

2. The method of claim 1, wherein the archiving system is a remote, third-party archiving system.

3. The method of claim 1, wherein the at least one first business object is a business object of an enterprise software system.

4. The method of claim 1, wherein
the at least one first business object is related to at least one other business object of a type different from the business object type of the at least one first business object, and
the type-specific metadata identifies the at least one other business object.

5. The method of claim 1, wherein the type-specific metadata includes data identifying the first structured business data and referencing a location where at least a portion of the first structured business data can be accessed.

6. The method of claim 5, wherein the location is remote from the at least one archiving system.

7. The method of claim 6, wherein the location is another archiving system storing an archived version of the portion of the first structured business data.

8. The method of claim 1, wherein the type-specific metadata includes snapshot data of the first structured business data, the snapshot data including fields parsable by the at least one archiving system.

9. The method of claim 8, wherein the snapshot data includes flattened business data including at least a portion of the first structured business data.

10. The method of claim 8, wherein the snapshot data identifies at least one other business object related to the at least one first business object, the other business object having a business object type different from the business type of the at least one first business object.

11. The method of claim 1, wherein the first business object type is different than the second business object type and the archiving system can identify that the first archive-type object is associated with the first business object type and that the second archive-type object is associated with the second business object type.

12. The method of claim 1, wherein the second archive-type object is exported to an archiving system other than the at least one archiving system storing the first archive-type object.

13. The method of claim 1, wherein the at least one archive-type object is exported to the at least one archiving system through an enterprise content management interface.

14. A non-transitory computer-readable medium storing instructions operable to cause at least one machine to perform operations comprising:
identifying at least one first business object for archiving, the at least one first business object having associated data including:
type data corresponding to a first business object type of the at least one first business object,
first structured business data, and
first unstructured attachment data comprising an electronic version of a printed document;
creating at least one first searchable archive-type object corresponding to the at least one first business object by enriching the first unstructured attachment data with first type-specific metadata including data identifying at least one attribute of the first business object type and including the enriched first unstructured attachment data in the at least one first archive-type object, the at least one first searchable archive-type object searchable based on the enrichment to the first unstructured attachment data;
exporting the at least one first archive-type object that includes the enriched first unstructured attachment data to at least one archiving system for storage in at least one memory device of the archiving system,
wherein the at least one first archive-type object is archive-system-independent;
identifying at least one second business object for archiving, the at least one second business object having associated data including:
type data corresponding to a second business object type of the at least one second business object,
second structured business data, and
second unstructured attachment data comprising an electronic version of another printed document;
creating at least one second archive-type object corresponding to the at least one second business object by enriching the second unstructured attachment data with second type-specific metadata including data identifying at least one attribute of the second business object type and including the enriched second unstructured attachment data in the at least one second archive-type object; and
exporting the at least one second archive-type object that includes the enriched second unstructured attachment data to at least one archiving system.

15. The medium of claim 14, wherein the archiving system is a remote, third-party archiving system.

16. A system comprising:
at least one machine containing at least one processor; and
a computer-readable medium storing instructions executable by the at least one machine to perform operations comprising:
identifying at least one first business object for archiving, the at least one first business object having associated data including:
type data corresponding to a first business object type of the at least one first business object,
first structured business data, and
first unstructured attachment data comprising an electronic version of a printed document;
creating at least one first searchable archive-type object corresponding to the at least one first business object by enriching the first unstructured attachment data with first type-specific metadata including data identifying at least one attribute of the first business object type and including the enriched first unstructured attachment data in the at least one first archive-type object, the at least one first searchable archive-type object searchable based on the enrichment to the first unstructured attachment data;
exporting the at least one first archive-type object that includes the enriched first unstructured attachment data to at least one archiving system for storage in at least one memory device of the archiving system,
wherein the at least one first archive-type object is archive-system-independent;
identifying at least one second business object for archiving, the at least one second business object having associated data including:
type data corresponding to a second business object type of the at least one second business object, second structured business data, and second unstructured attachment data comprising an electronic version of another printed document;

creating at least one second archive-type object corresponding to the at least one second business object by enriching the second unstructured attachment data with second type-specific metadata including data identifying at least one attribute of the second business object type and including the enriched second unstructured attachment data in the at least one second archive-type object; and exporting the at least one second archive-type object that includes the enriched second unstructured attachment data to at least one archiving system.

17. The system of claim 16, wherein the archiving system is a remote, third-party archiving system.

18. The system of claim 16, wherein the at least one first business object is a business object of an enterprise software system.

19. The system of claim 16, wherein the at least one first business object is related to at least one other business object of a type different from the business object type of the at least one first business object, and the type-specific metadata identifies the at least one other business object.

20. The system of claim 16, wherein the type-specific metadata includes data identifying the first structured business data and referencing a location where at least a portion of the first structured business data can be accessed.

* * * * *